United States Patent [19]

O'Toole

[11] 4,269,969

[45] May 26, 1981

[54] POLYBUTADIENEDIOL PURIFICATION

[75] Inventor: James T. O'Toole, Philadelphia, Pa.

[73] Assignee: Atlantic Richfield Company, Los Angeles, Calif.

[21] Appl. No.: 93,467

[22] Filed: Nov. 13, 1979

[51] Int. Cl.³ ............................ C08F 6/10; C08C 2/02
[52] U.S. Cl. ................................ 528/498; 526/340.1; 528/501
[58] Field of Search ........................................ 528/498

[56] References Cited

U.S. PATENT DOCUMENTS

| | | | |
|---|---|---|---|
| 2,432,386 | 12/1947 | Craig | 526/340.1 |
| 2,844,568 | 7/1958 | Mertz | 526/340.1 |
| 3,412,779 | 11/1968 | Wagner | 528/501 X |
| 3,562,227 | 2/1971 | di Drusco | 528/498 X |
| 3,673,168 | 6/1972 | Burke, Jr. | 526/340.1 |
| 3,920,624 | 11/1975 | Humkey | 528/501 |
| 4,186,047 | 1/1980 | Salmon | 159/2 E |

Primary Examiner—C. A. Henderson
Attorney, Agent, or Firm—John R. Ewbank

[57] ABSTRACT

Butadiene is polymerized using hydrogen peroxide as a catalyst to provide polybutadiene (partaking of the nature of a polymethylenediol) suitable for use in making polyurethanes by reaction with diisocyanate compounds. Minor amounts of vinyl cyclohexene and related odiferous impurities are contaminants in such polybutadiene. Such contaminants are predominantly removed by selective volatilization during one or more treatments in a hot vacuum zone, the feedstock to the hot vacuum zone containing from about 0.4 to about 6% of a $C_9$—$C_{13}$ saturated hydrocarbon entraining agent.

7 Claims, No Drawings

POLYBUTADIENEDIOL PURIFICATION

FIELD OF INVENTION

This invention relates to preparation of polybutadiene suitable for use in manufacturing urethanes, and particularly to deodorizing such polybutadiene.

PRIOR ART

Butadiene can be polymerized in solution containing hydrogen peroxide to produce a butadiene resin by a process which has been practiced industrially for several years. The butadiene resin partakes of the nature of a polymethylene diol having terminal hydroxy groups which can react with polyisocyanates to provide polyurethanes having important advantages over polyurethanes derived from polyethers. Small amounts of vinyl cyclohexene are formed during such polymerization, and contribute to an objectionable odor of some batches of polybutadiene.

Toekes U.S. Pat. No. 3,311,676 describes the removal of odiferous contaminants from a styrene-butadiene interpolymer by including relatively large proportions of volatile components, whereby a hot foam is generated, and the foam is directed to a phase separator to permit vacuum withdrawal of the vapor from the molten plastic.

U.S. Pat. No. 3,477,491 describes one type of evaporator employed in deodorizing a polymeric composition.

Chisholm U.S. Pat. No. 3,409,712 describes another type of apparatus for devolatilizing polymeric compositions.

Hunt et al U.S. Pat. No. 2,970,089 devolatilizes polymers at 125° F. and 50 mm pressure.

Notwithstanding the production and marketing of polybutadiene for several years, no satisfactory solution to the malodorous odor of polybutadiene has been found.

SUMMARY OF INVENTION

In accordance with the present invention, a $C_9$-$C_{13}$ saturated hydrocarbon solvent is admixed with an impure composition containing polybutadiene, and such blend is subjected to vacuum treatment to volatilize much of the thus added hydrocarbon entraining agent, whereby much of the vinyl cyclohexene is covolatilized therewith, whereby a deodorized polybutadiene containing less vinyl cyclohexene is recovered. In preferred embodiments, the residual vinyl cyclohexene is less than about 20 ppm.

The nature of the invention is further clarified by a plurality of examples.

EXAMPLE 1

Butadiene was polymerized using hydrogen peroxide as the catalyst. The polymer was subjected to devolatilization using a wiped film evaporator, thereby, reducing the concentration of vinyl cyclohexene to about 500 ppm, at a manufacturing plant, and samples of the polybutadiene (PBD) were sent to a research laboratory for evaluation.

In a control test, samples were devolatilized in a Rotovac type apparatus at about 220° F. (about 104° C.) at a pressure of about 5 mm, with measurements being made to determine the effectiveness of such treatment in removing vinyl cyclohexene (VCH). As shown in Table I, significant amounts of malodorous vinyl cyclohexene remained even after 72 hours of conventional devolatilization.

TABLE I

Devolatilization of PBD at 220° F. (about 104° C.) at 5mm (Rotovac)

| Treatment hours | Vinyl Cyclohexene % by Weight in PBD | removed |
|---|---|---|
| 0 | 509 ppm | none |
| 24 | 279 | 230 |
| 48 | 241 | 258 |
| 72 | 141 | 368 |

In accordance with the invention, a blend was prepared of 5% normal decane and 95% PBD, and such blend was devolatilized in the Rotovac apparatus at 220° F. (about 104° C.) at 5 mm. After 4 hours treatment, the PBD contained less than 10 ppm of VCH, thus demonstrating the remarkable propensity of VCH to covolatilize with the normal decane at hot vacuum conditions.

EXAMPLE 2

Following the procedure of Example 1, but preparing the blend from 95% PBD and 5% a deodorized paraffinic kerosene having a mixture of $C_9$ to $C_{13}$ paraffinic hydrocarbons, it was observed that during an 8 hour period, the effectiveness of the Rotovac treatment on removal of VCH was closely similar to that noted with normal decane, but there was a greater propensity for a residue of deodorized kerosene to remain in the deodorized PBD.

EXAMPLE 3

A blend was prepared consisting of 99% PBD and 1% normal decane and such blend was devolatilized at 220° F. (about 104° C.) at 5 mm pressure in the Rotovac apparatus. The VCH concentration was satisfactorily reduced to less than about 10 ppm after about 15 hours.

EXAMPLE 4

At the plant at which butadiene is polymerized to PBD, the product from the first stage deodorizer was stored and then blended with 1% normal decane. Such blend was then devolatilized in the same wiped film evaporator used for the first stage devolatilization. This batch of PBD had a concentration of VCH of 1000 ppm prior to the covolatilization treatment, but less than 5 ppm of VCH after such reprocessing. The Brookfield viscosity of the deodorized PBD was 5600 cps at 30° C., and thus corresponded to the viscosity characteristics which have helped to establish a market for PBD.

EXAMPLE 5

Butadiene was polymerized using hydrogen peroxide as the catalyst to provide a crude reaction product from the polymerization reactor. Such composition was modified by blending therewith an amount of 1,2 diethylcyclohexane corresponding to 5% of the polybutadiene content. This blend was devolatilized in a wiped film evaporator to provide a deodorized resin containing about 18 ppm of vinyl cyclohexene while the temperature was maintained at about 220° F. (about 104° C.) and the pressure was about 5 mm. The deodorized butadiene was suitable for production of polyurethanes by reaction with polyisocyanates. The butadiene resin partakes of the nature of a polymethylenediol and can be designated as a polybutadienediol but is generally known by the name under which it has been marketed, that is, polybutadiene.

EXAMPLE 6

By a series of experiments it is established that the volatility of the entraining agent should be somewhat less at the volatilization temperature than the volatility of the component whose removal is most important.

Similarly it is established that the blend must contain from about 0.4 to about 6%, desirably 0.5 to 2% of such entraining agent, and that the elevated temperature treatment must be conducted for an effective period of time. If equipment of the Rotovac type is employed, each batch may be vacuum devolatilized for from 2 to 10 hours, desirably 3 to 7 hours. The residence time in continuous thin film equipment can be measured in seconds or minutes. The entraining agent must be a saturated hydrocarbon in which substantially all molecules range from about 9 to about 13 carbon atoms. In preferred embodiments, the severity of devolatilization is so controlled (regulation of time, space rate, pressure, temperature, concentration of entraining agent in the blend, closeness of entraining agent volatility to VCH volatility, etc.) that the residual polybutadiene has less than 20 ppm of VCH. The temperature should be within the range from 200° to 250° F. (about 93° C. to about 121° C.), desirably 210° F. to 230° F. (about 99° C. to about 110° C.). Even more important then the temperature is the pressure, which should be within the range from 2 to 300 mm, desirably 3 to 100 mm. Any of a variety of systems may be used for conducting the vacuum devolatilization, but the system featuring a wiped film evaporator is preferred.

Various modifications of the invention are possible without departing from the scope of the invention as set forth in the claims.

I claim:

1. In the method of deodorizing in which a polybutadiene suitable for preparing polyurethanes by reaction with polyisocyanates is prepared by polymerization of butadiene in a system containing hydrogen peroxide as the catalyst, the improvement which consist of:
    modifying a composition containing said polybutadiene by blending therewith sufficient kerosene consisting predominantly of saturated hydrocarbons having at least 9 but not more than 13 carbons, as a hydrocarbon entraining agent, to constitute from about 0.4 to about 6% of said polybutadiene to prepare a blended composition;
    subjecting said blended composition to a hot vacuum zone at about 93° C. about 121° C. at 2 to 300 mm pressure to volatilize substantial portions of any vinyl cyclohexene, any related odiferous materials, hydrocarbon entraining agent, and any other components covolatilizable therewith, thereby providing a deodorized polybutadiene composition containing less than 20 ppm of vinyl cyclohexene and recovering said deodorized composition as the product of the method.

2. The method of claim 1 in which the concentration of entraining agent is within the range from 0.5 to 2%.

3. The method of claim 1 in which the hydrocarbon entraining agent is blended into a composition derived from hot vacuum treatment of the product from the polymerization reaction.

4. The method of claim 1 in which the concentration of entraining agent is within the range from 0.5 to 2%, the hydrocarbon entraining agent is blended into a composition derived from hot vacuum treatment of the product from the polymerization reaction, the temperature is within the range from 99° C. to, 110° C. the pressure is within the range from 3 to 100 mm, and the hot vacuum zone features a wiped film evaporator.

5. The method of claim 1 in which the temperature is within the range from 99° C. to 110° C.

6. The method of claim 1 in which the pressure is within the range from 3 to 100 mm.

7. The method of claim 1 in which the hot vacuum zone features a wiped film evaporator.

* * * * *